United States Patent [19]

Matono et al.

[11] Patent Number: 5,436,781
[45] Date of Patent: Jul. 25, 1995

[54] THIN FILM MAGNETIC HEAD HAVING UPPER MAGNETIC CORE LAYER WITH LAYERS SEPARATED BY DISCONTINUOUS NON-MAGNETIC STRIPES

[75] Inventors: Naoto Matono, Kadoma; Isao Yasuda, Katano; Tomomi Yamamoto, Hirakata; Hitoshi Noguchi, Higashiosaka, all of Japan

[73] Assignee: Sanyo Electric Co., Ltd., Osaka, Japan

[21] Appl. No.: 172,241

[22] Filed: Dec. 23, 1993

[30] Foreign Application Priority Data

Dec. 25, 1992 [JP] Japan .................. 4-345859
Mar. 25, 1993 [JP] Japan .................. 5-066573

[51] Int. Cl.⁶ .......................................... G11B 5/31
[52] U.S. Cl. ............................................. 360/126
[58] Field of Search ............................. 360/126

[56] References Cited

U.S. PATENT DOCUMENTS

| 4,841,402 | 6/1989 | Imanaka et al. ........ 360/126 |
| 5,047,886 | 9/1991 | Toyoda et al. ......... 360/126 |
| 5,313,356 | 5/1994 | Ohkubo et al. ......... 360/126 |

FOREIGN PATENT DOCUMENTS 3-181010  8/1991  Japan .

OTHER PUBLICATIONS

"Magnetic thin films in recording technology", V. S. Speriosu et al. IBM J. Res. Develop. vol. 34, No. 6, Nov. 1990, pp. 884–891.
Summaries of 15th Scientific Lecture of Japan Application Magnetism Society, p. 19.
Summaries of 14th Scientific Lecture of Japan Application Magnetism Society, p. 163.

*Primary Examiner*—Robert S. Tupper
*Attorney, Agent, or Firm*—Nikaido, Marmelstein, Murray & Oram

[57] ABSTRACT

A thin film magnetic head including a lower magnetic core and an upper magnetic core formed of thin films for forming a magnetic circuit with coil windings therebetween enclosed in non magnetic material. The upper core includes an upper magnetic layer, a lower magnetic layer and a discontinuous non-magnetic intermediate layer of a plurality of non-magnetic stripes.

1 Claim, 12 Drawing Sheets

Hex

THIN FILM MAGNETIC HEAD HAVING UPPER MAGNETIC CORE LAYER WITH LAYERS SEPARATED BY DISCONTINUOUS NON-MAGNETIC STRIPES

FIELD OF THE INVENTION

The present invention relates to a thin film magnetic head provided In a magnetic disk device or the like, and in particular, to a thin film magnetic head suitable for a compact magnetic recording device for high density recording.

BACKGROUND OF THE INVENTION

In accordance with reduction of sizes and increase of speeds of computers in recent years, magnetic disk devices used as external storage devices have been required to reduce the sizes and increase the capacities and operation speeds. In view of this, thin film magnetic heads capable of high density recording with a low inductance have been earnestly developed for use as the magnetic heads for magnetic disk devices.

Figure 20:
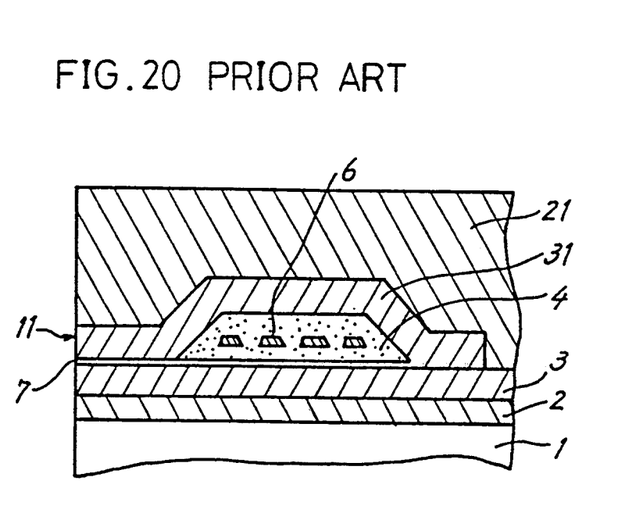
FIG. 20 is a cross section of a thin film magnetic head in the prior art.

Such a thin film magnetic head includes a substrate 1 as shown in FIG. 20, and also includes an insulating film 2, a lower magnetic core 3, a gap spacer 7, a conductive coil layer 6 covered with a coil layer insulating film 4, an upper magnetic core 31 and a protection layer 21 which are layered in this order on the substrate 1.

The substrate 1 is made of ceramics such as $AL_2O_2$—TiC. The insulating film 2 and gap spacer 7 are made of insulating substance such as $SiO_2$ or $AL_2O_3$. The magnetic cores 3 and 31 are made of magnetic material such as Ni—Fe, Fe—Al—Si or Co—Zr—Nb.

The aforementioned layers or films forming the thin film magnetic head are respectively formed by photolithography, electroplating, vapor deposition or other known thin film forming technique.

In a process of forming the magnetic film, vapor deposition or sputtering is effected in a magnetic field to induce a uniaxial anisotropy in a direction of a track width so as to achieve a high magnetic permeability in a high frequency area. It has been proposed in Unexamined Japanses Patent Publication HEI.3-181010 that magnetic anisotropy 1s applied to a surface of a magnetic film by thermal processing or others in a magnetic field after forming the film.

The thin film magnetic head having the uniaxial anisotropy induced in the magnetic core performs signal recording and signal reproduction by rotation of a magnetization direction, so that it can reduce noises compared with the case where domain walls move (see IBM J. RES. DEVELOP, Vol. 34, No. 6, November 1990, pp 884–891).

Figure 21:
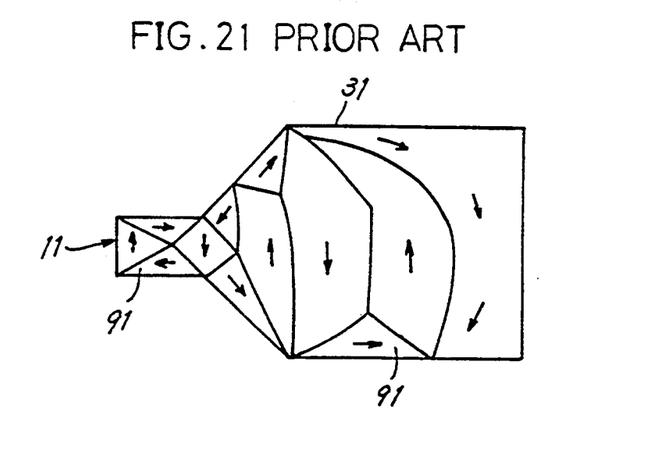
FIG. 21 is a plan showing a domain structure of an upper magnetic core in the thin film magnetic head in the prior art.

When forming the upper magnetic core 31 shown in FIG. 20, a magnetic film having the unidirectional anisotropy is formed on the whole surface of the insulating film 4, and then the magnetic film is patterned by ion beam etching or the like as shown in FIG. 21. In this patterning step, it is inevitable that crystals are disarranged at the edge of the pattern, resulting in deterioration of characteristics.

As a result, fluctuation generates in the unidirectional anisotropy induced immediately after the film formation, and thereby triangular reflux domains 91 generate, or the anisotropy applied in the film forming process is cancelled, resulting in a transient domain structure.

The thin film magnetic head including the magnetic core having the aforementioned domain structure may cause so-called wiggle noises or popcorn noises due to movement of the domain walls during reproduction of signals on the magnetic recording medium (see Summaries of 15th Scientific Lecture of Japan Application Magnetism Society, p. 19, and Summaries of 14th Scientific Lecture of Japan Application Magnetism Society, p. 163).

As a result, distortion may generate in a reproduced waveform, which frequently causes an error in reproduced information.

Further, substance of the magnetic core is restricted to material in which unidirectional anisotropy can be induced in the track width direction, i.e., material such as Ni—Fe in which magnetic anisotropy is not induced to a large extent. Material having a large saturation flux density cannot be used as the above substance. Therefore, the recording capability of the thin film head is restricted.

SUMMARY OF THE INVENTION

Accordingly, it is an object of the invention to provide a thin film magnetic head, in which a magnetic head can be made of substance having a large saturation magnetic flux density, and unidirectional anisotropy in a track width direction can be effectively induced with respect to the magnetic core.

The present invention provides a first thin film magnetic head (FIGS. 1 and 2), wherein an absolute value of a magnetostriction constant of a magnetic core 31 for forming a magnetic circuit is not more than $1 \times 10^{-6}$, and a plurality of metal stripes 5 covering at least a front core portion 32 is formed on the magnetic core 31 with a space between each other, the metal stripes extending in a track width direction and having an internal stress oriented in the track width direction.

The present invention also provides a second thin film magnetic head (FIGS. 6 and 7), wherein a magnetic core 31 for forming a magnetic circuit has an axis of easy magnetization which is parallel to a track width direction, and two antiferromagnetic metal ribs 8 covering at least a front core portion 32 is formed on the magnetic core 31, the antiferromagnetic metal ribs extending along opposite sides, in view of the track width direction, of the magnetic core and having unidirectional anisotropy in the track width direction.

The present invention further provides a third thin film magnetic head (FIGS. 11 and 12), wherein a magnetic core 31 is formed of two layers which are a core lower layer portion 35 and a core upper layer portion 36, and a non-magnetic intermediate layer 52 is interposed between the two layers.

In the first thin film magnetic head described above, since the metal stripes 5 having the internal stress in the track width direction are disposed on the magnetic core 31 having the magnetostriction constant, of which absolute value is not more than $1 \times 10^{-6}$, the magnetic core 31 receives a compressive or tensile stress from the metal stripes 5, so that the magnetic domains are stabilized in the direction of the stress.

Figure 2:
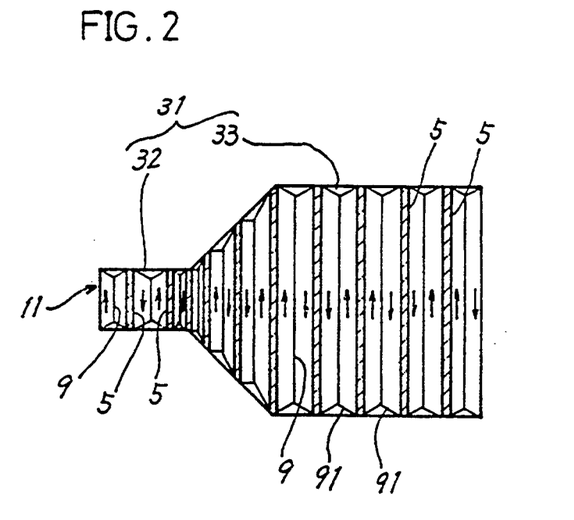
FIG. 2 is a plan showing a pattern of metal stripes and a domain structure of an upper magnetic core in the thin film magnetic head.

In general, the magnetic domain structure depends on a sum of a magnetostatic energy and a domain wall energy, and is determined to set the sum to an extremely small value. In the invention since the domains are stable in the direction of the metal stripes, i.e., track width direction as described above, the domain structure of the magnetic core is mainly governed by the 180-degree domain walls 9 parallel to a medium contact surface 11 as shown in FIG. 2. Therefore, reflux domains 91 are small.

Figure 8:
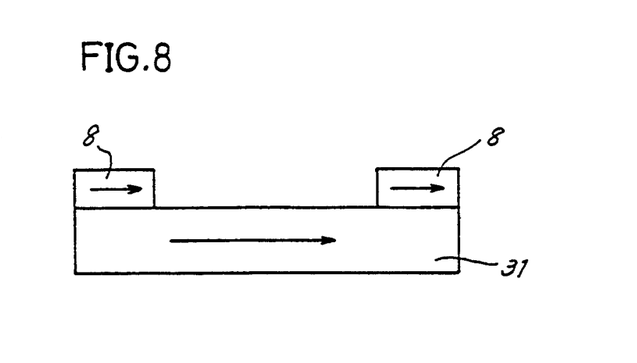
FIG. 8 shows exchange coupling between the antiferromagnetic metal ribs and the upper magnetic core.

In the second thin film magnetic head, as shown in FIG. 8, the two antiferromagnetic metal ribs 8, which extend along the opposite sides in view of the track width direction and have unidirectional anisotropy in the track width direction, are formed on the magnetic core 31. Therefore, the magnetic core 31 effects exchange coupling with these antiferromagnetic metal ribs 8 as indicated by arrow of solid line in FIG. 8, resulting in reduction of energy and stabilization.

Figure 7:
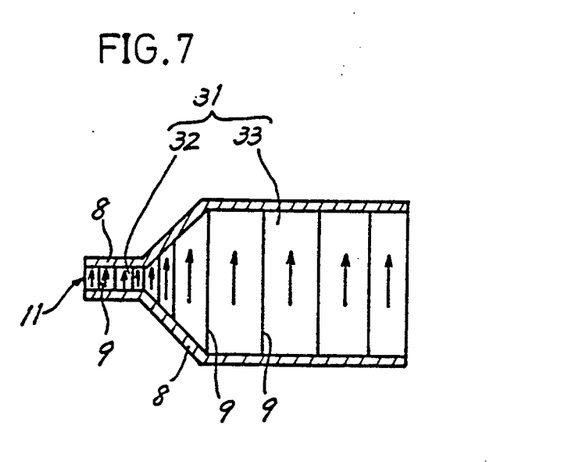
FIG. 7 is a plan showing configurations of antiferromagnetic metal ribs and a domain structure of an upper magnetic core in the thin film magnetic head.

Therefore, the domains are stabilized in the track width direction, and the 180-degree domain walls 9 parallel to the medium contact surface 11 is formed, as shown in FIG. 7, so that a reflux domain disappears.

In the third thin film magnetic head, the non-magnetic intermediate layer 52 interposed between the core lower layer portion 35 and the core upper layer portion 36 functions to control the state of magnetic coupling between the core lower layer portion 35 and the core upper layer portion 36 and also functions to control the domain structure of the magnetic core. As a result, the domains of the magnetic core are stabilized in the track width direction.

As described above, the thin film magnetic head which includes the magnetic core provided with the 180-degree domain walls 9 performs recording and reproduction of signals by rotation of the magnetization direction. Therefore, the thin film magnetic head can reduce noises compared with a magnetic head in which the conventional reflux domains are formed.

In the thin film magnetic head according to the invention, the unidirectional anisotropy in the track width direction can be effectively induced in the magnetic core owing to the operation of the metal stripes, antiferromagnetic metal ribs or non-magnetic intermediate layer, whereby distortion of the waveform during reproduction of signals can be effectively suppressed. The substance of the magnetic core can be Fe-containing magnetic material having a high saturation magnetic flux density.

BRIEF DESCRIPTION OF THE DRAWINGS

FIGS. 3(a) and 3(b) show a first part of a process of manufacturing the thin film magnetic head, and particularly.

FIGS. 4(a) and 4(b) show a second part of the manufacturing process, and particularly.

DETAILED DESCRIPTION OF EMBODIMENTS

First Embodiment (FIGS. 1 to 5)

Figure 1:
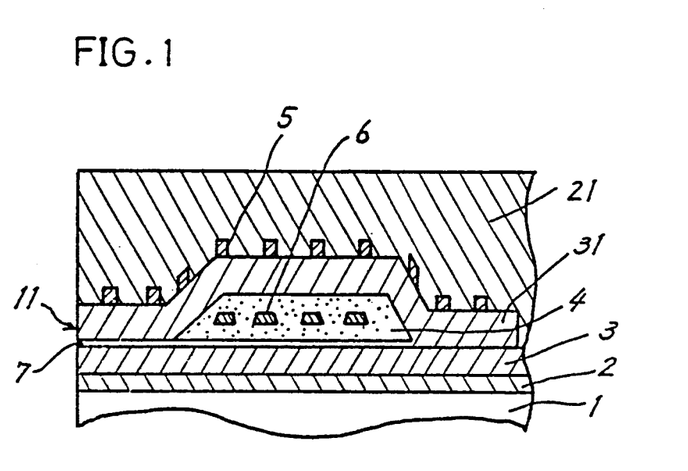
FIG. 1 is a cross section of a first thin film magnetic head according to the invention.

As shown in FIG. 1, a thin film magnetic head includes a ceramic substrate 1, and also includes an insulating film 2, a lower magnetic core 3, a gap spacer 7, a conductive coil layer 6 covered with a coil layer insulating film 4, an upper magnetic core 31 and a protection layer 21 which are layered in this order on the substrate 1. On a surface of the upper magnetic core 31, there are repetitively formed a plurality of metal stripes 5 with a predetermined space between each other. The metal stripes 5 extend in a track width direction as shown in FIG. 2, and have tensile or compressive internal stresses in the track width direction.

The lower and upper magnetic cores 3 and 31 are made of magnetic material having a magnetostriction constant of which absolute value is not more than $1 \times 10^{-6}$, such as amorphous containing Ni—Fe, Fe—Al—Si or Co—Zr—Nb as a major component. The metal stripes 5 are formed of non-magnetic metal such as Cu, Ti or Pd, of which thin film can have a relatively large internal stress.

Figures 3A, 3B:
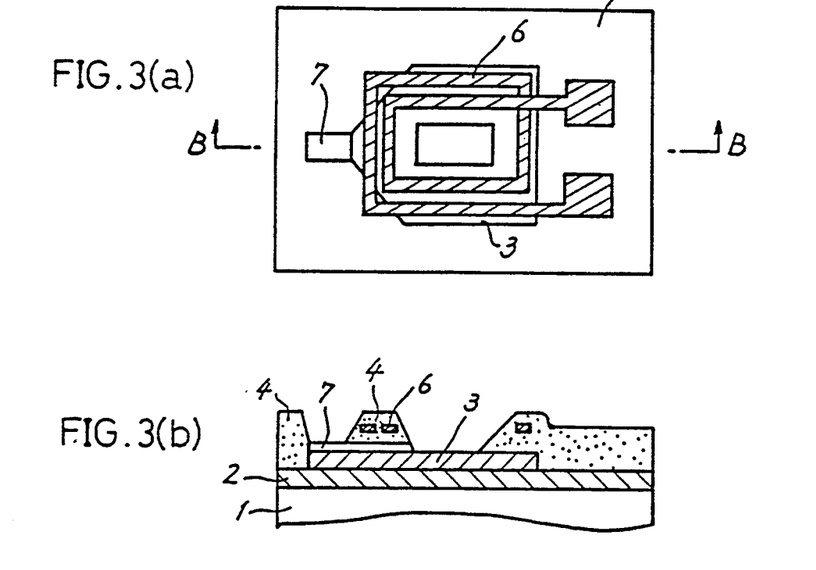
FIG. 3(a) is a plan and FIG. 3(b) is a cross section taken along line B—B in FIG. 3(a)

FIGS. 3(a),(b)–5 show a method of manufacturing the thin film magnetic head.

First, a layered structure shown in FIGS. 3(a) and 3(b) are formed by a conventional process. Specifically, the insulating film 2, lower magnetic core 3, gap spacer 7, conductive coil layer 6 and coil layer insulating film 4 are successively formed on the substrate 1.

Figures 4A, 4B:
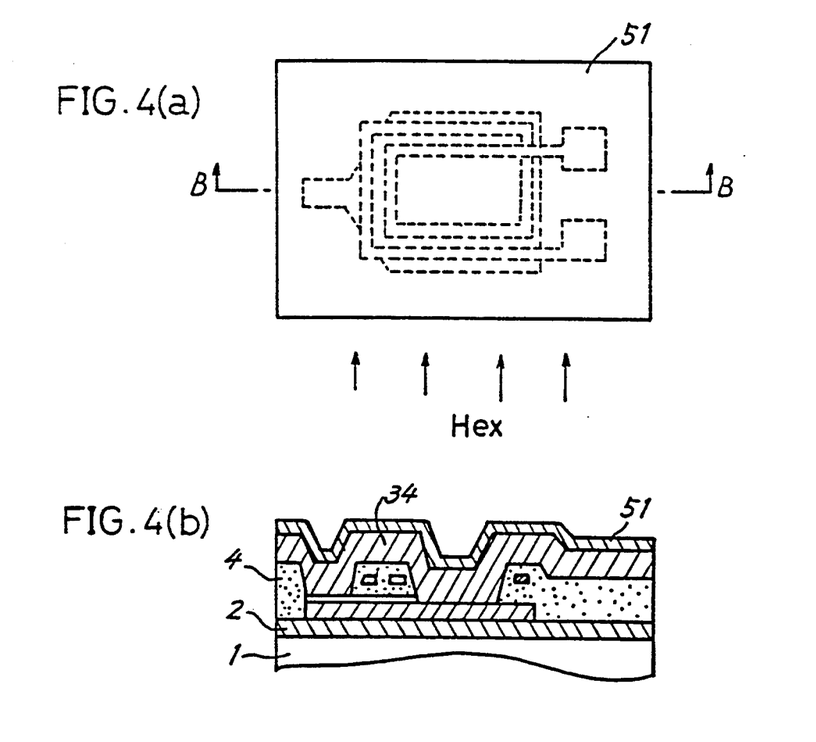
FIG. 4(a) is a plan and FIG. 4(b) is a cross section taken along line B—B in FIG. 4(a)

Then, as shown in FIG. 4(b), a magnetic film 34 covering the aforementioned layered structure is formed. In this step, the magnetic film 34 is formed to have a predetermined thickness by effecting vapor deposition or sputtering while applying a magnetic field Hex not exceeding 100 Oe in the track width direction as indicated by arrow in the FIG. 4(a) or not applying the magnetic field.

Each of the aforementioned layers and films is formed under the conditions that its internal stress takes the value of zero.

Thereafter, as shown in FIG. 4(b), a non-magnetic metal film 51 made of, e.g., Cu, Ti or Pd and having a thickness of 0.5 to 3 μm is formed on the surface of the magnetic film 34.

In this step, conditions of sputtering such as a gas pressure of Ar, a supplied electric power, a distance between the substrate and the target, and/or a temperature of the substrate are appropriately selected to apply a tensile or compressive internal stress to the magnetic film 34. For example, if Ti is used, the temperature of the substrate may be set to 200° C., whereby the internal stress of 40 kg/mm$^2$ can be generated.

Figure 5:
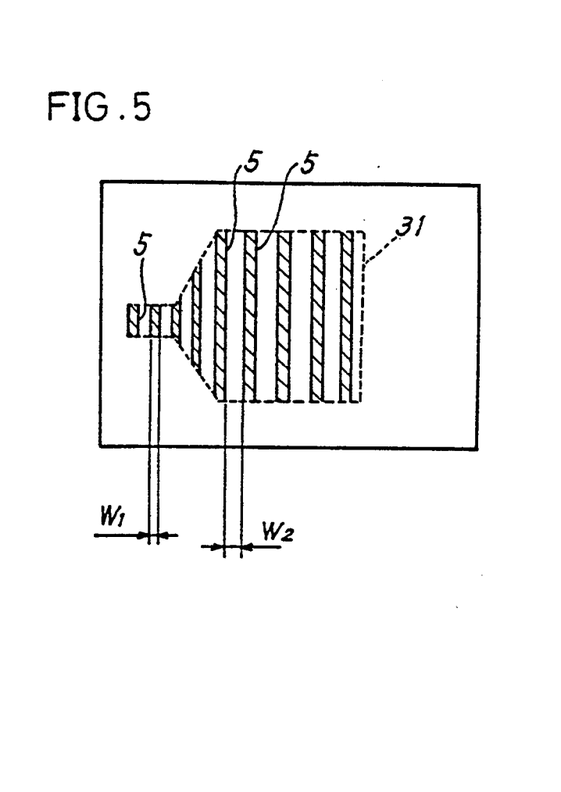
FIG. 5 is a plan showing a third part of the manufacturing process.

Then, as shown in FIG. 5, photolithography is used to pattern the non-magnetic metal film 51 in the track width direction and thereby form the plurality of metal stripes 5 extending in the track width direction. In this step, it is preferable to set a width $W_1$ of the metal stripe 5 to a value between about 0.5 μm and 2 μm and set a space $W_2$ between the adjacent metal stripes 5 to a value between about 2 μm and 10 μm.

In the step of patterning the non-magnetic metal film 51 to form the metal stripes 5, the internal stress of the non-magnetic metal film 51 is oriented lengthwise of the pattern, i.e., in the track width direction.

Thereafter, the protection layer 21 made of SiO$_2$ or Al$_2$O$_3$ is formed as shown in FIG. 1. In this step, the conditions of sputtering are selected to minimize the internal stress of the protection layer 21 in order to prevent peeling of the metal stripes 5 and hence reduction of a yield.

As a result, the upper magnetic core 31 has the magnetic domain structure which includes small reflux domains 91 as shown in FIG. 2, and is mainly governed by the 180-degree domain walls 9 parallel to the medium contact surface 11.

The lower magnetic core 3 receives the magnetic influence by the upper magnetic core 31, so that a similar magnetic domain structure is induced.

In the above embodiment, the metal stripes 5 are formed on the whole area of the upper magnetic core 31. Alternatively, such a structure may be employed that the metal stripes 5 are formed only on a front core portion 32 and are not formed on a back core portion 33.

Second Embodiment (FIGS. 6 to 10)

Figure 6:
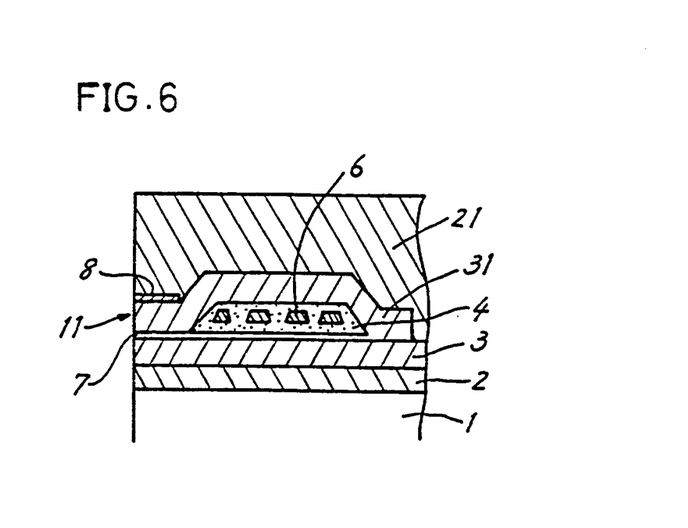
FIG. 6 is a cross section of a second thin film magnetic head according to the invention.

The thin film magnetic head shown in FIGS. 6 and 7 includes the ceramic substrate 1, and also includes the insulating film 2, lower magnetic core 3, gap spacer 7, conductive coil layer 6 covered with the coil layer insulating film 4, upper magnetic core 31 and protection layer 21 which are layered in this order on the substrate 1. The magnetic cores 3 and 31 have axes of easy magnetization parallel to the track width direction, and two antiferromagnetic metal ribs 8 extending along the opposite sides, in view of the track width direction, of the upper magnetic core 31 are formed on the surface of the upper magnetic core 31.

The antiferromagnetic metal ribs 8 are made of antiferromagnetic material such as FeMn, MnCr or FeCr, and have unidirectional anisotropy In the track width direction.

In the aforementioned thin film magnetic head, as shown in FIG. 8, the antiferromagnetic metal ribs 8 are coupled to the upper magnetic core 31 by exchange coupling, i.e., antiferromagnetic coupling owing to the unidirectional anisotropy of the antiferromagnetic metal ribs 8 as indicated by arrow of solid line in FIG. 8, so that the unidirectional anisotropy in the track width direction is induced with respect to the upper magnetic core 31. Particularly, according to the invention, the antiferromagnetic metal ribs 8 are disposed at the peripheral portions of the core in which reflux domains are likely to generate, so that the above peripheral portions have the same magnetization direction as the antiferromagnetic metal ribs 8.

As a result, the whole area of the upper magnetic core 31 has the unidirectional anisotropy, and no reflux domain exists.

FIGS. 9(a)-9(c), 10(a) and (b) show a method of manufacturing the aforementioned thin film magnetic head.

Figure 9A:
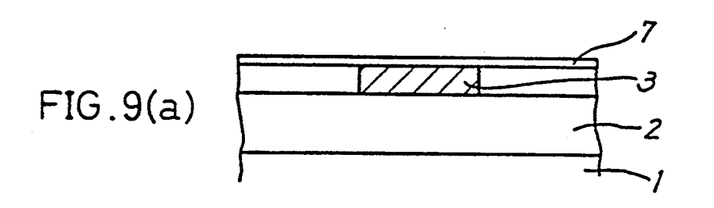
FIGS. 9(a), 9(b) and 9(c) are cross sections showing a series of steps in the first part of the process of manufacturing the thin film magnetic head.

First, a conventional method is effected to form the insulating film 2, lower magnetic core 3 and gap spacer 7 on the ceramic substrate 1 as shown in FIG. 9(a).

Figure 9B:
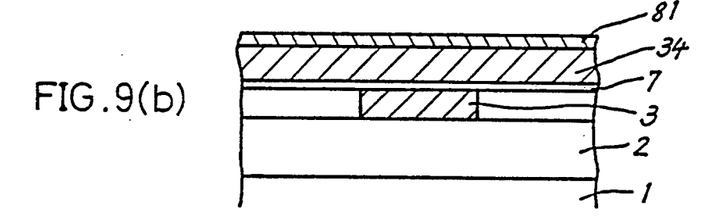

Then, the magnetic film 34 which has a predetermined thickness and will form the upper magnetic core is formed on the surface of the gap spacer 7 by sputtering or vapor deposition as shown in FIG. 9(b).

Subsequently, vapor deposition in the magnetic field or sputtering in the magnetic field is used to form an antiferromagnetic metal film 81 which is thinner than the magnetic film 34. Thereby, the unidirectional anisotropy in the track width direction is applied to the antiferromagnetic metal film 81.

Figure 9C:
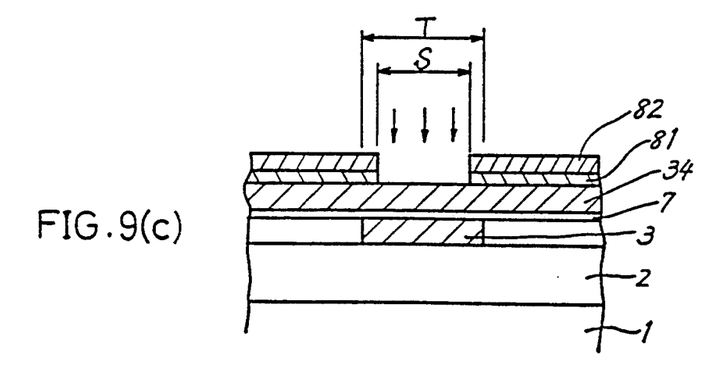
Figure 10A:
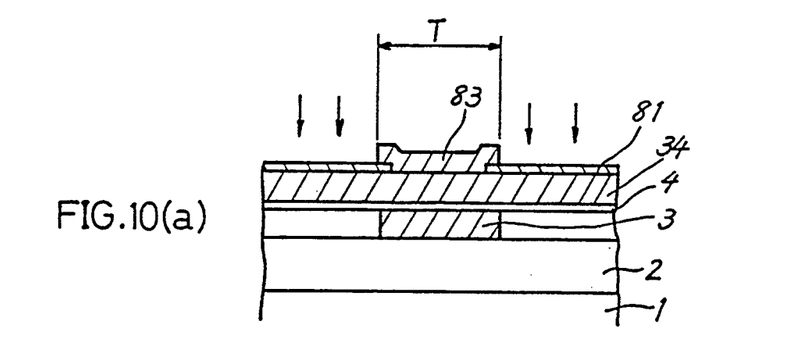
FIGS. 10(a) and 10(b) are cross sections showing a series of steps in the second part of the process of manufacturing the thin film magnetic head.
Figure 10B:
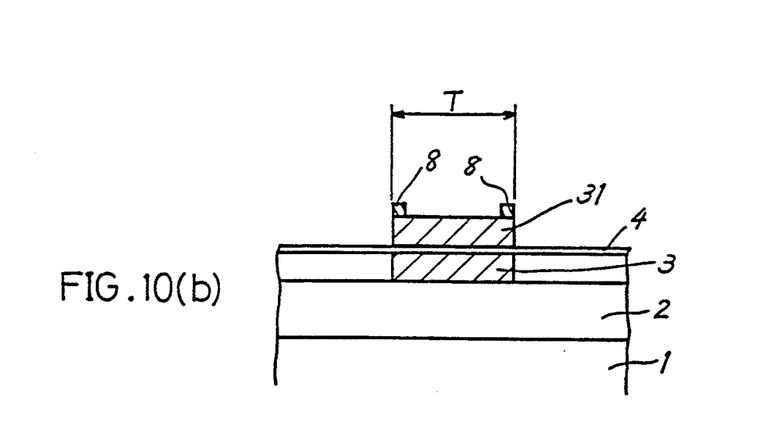

Thereafter, photolithography is used to pattern the antiferromagnetic metal film 81. A resist mask 82 having an opening of a width S smaller than a track width T is first formed as shown in FIG. 9(c), and then ion beam etching or chemical etching is effected on the antiferromagnetic metal film 81 to remove a region defined by the width S, As shown in FIG. 10(a), there is formed a resist mask 83 covering the opening region of the antiferromagnetic film 81, and ion beam etching or chemical etching is effected on the antiferromagnetic film 81 and the magnetic film 34 to form the upper magnetic core 31 of a predetermined configuration having the track width T as shown in FIG. 10(b). The aforementioned etching also forms the antiferromagnetic metal ribs 8 which are located at the opposite sides of the upper magnetic head 31 and each have a width not exceeding a third of the track width T.

Thereafter, steps similar to those in the prior art are carried out, e.g., for forming the protection film 21 and making a chip-form, and finally the thin film magnetic head shown in FIG. 6 is completed.

Since the thin film magnetic head includes the antiferromagnetic metal ribs 8 located at the peripheral portions at which the reflux domains are likely to generate as shown in FIG. 7, the 180-degree domain walls are formed at the whole area of the upper magnetic core 31.

Also in the lower magnetic core 3, a similar domain structure is induced by the magnetic influence of the upper magnetic core 31.

In the above embodiment, the antiferromagnetic metal ribs 8 each have the width not exceeding a third of the track width T for its entire length so as to prevent reduction of a steepness of the magnetic recording field. Alternatively, the width of the antiferromagnetic metal rib 8 at the back core portion 33 may be different from that at the front core portion 32, and further, the antiferromagnetic metal rib 8 at the back core portion 33 may be eliminated.

Third Embodiment (FIGS. 11 to 19)

Figure 11:
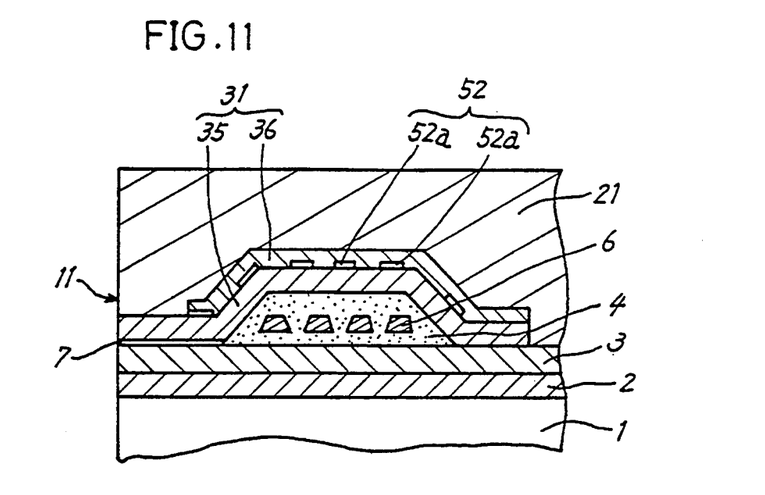
FIG. 11 is a cross section of a third thin film magnetic head according to the invention.
Figure 12:
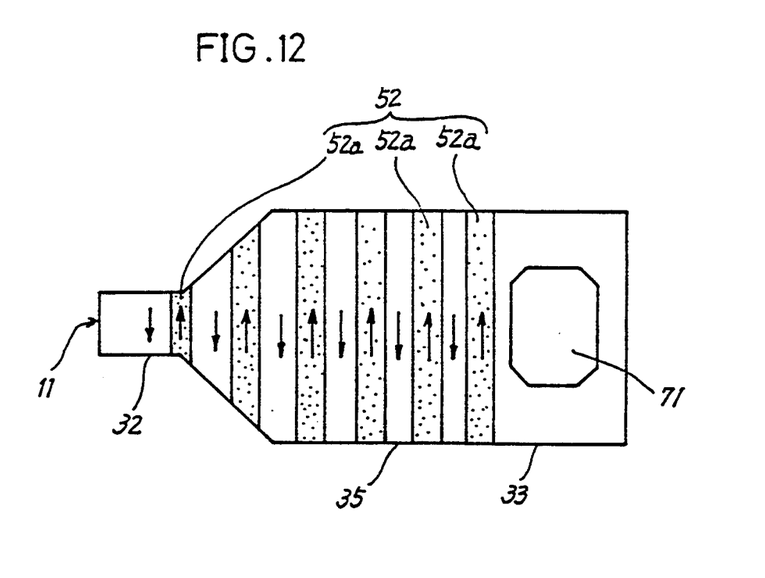
FIG. 12 is a plan showing a pattern of a non-magnetic intermediate layer and a magnetization direction of the core in the thin film magnetic head.

The thin film magnetic head shown in FIGS. 11 and 12 includes the ceramic substrate 1, and also includes the insulating film 2, the lower magnetic core 3, the gap spacer 7, the conductive coil layer 6 covered with the coil layer insulating film 4, the upper magnetic core 31 and the protection layer 21 which are layered in this order on the substrate 1. The insulating film 2 is made of, e.g., $SiO_2$ or $Al_3O_2$. The lower and upper magnetic cores 3 and 31 are made of metal magnetic films having a high magnetic permeability such as Ni—Fe or Co—Zr—Nb.

The upper magnetic core 31 is formed of two layers, i.e., a core lower layer portion 35 and a core upper layer portion 36, between which a non-magnetic intermediate layer 52 is interposed.

The non-magnetic intermediate layer 52 is made of an insulating film of, e.g., $SiO_2$ or $Al_3O_2$, and is formed of a plurality of non-magnetic stripes 52a, as shown in FIG. 12, which extend In the track width direction and are located at an intermediate region between the medium contact surface 11 in the front core portion 32 and a back gap 71 in the back core portion 33.

In the aforementioned thin film magnetic head, the non-magnetic intermediate layer 52 functions to effect pinning in the track width direction on the domains of the upper magnetic core 31, so that the domain structure can be stable without disarrangement.

FIGS. 13(a)-(d) and 14(a)-(c) show steps of manufacturing the thin film magnetic head described above.

Figure 13A:
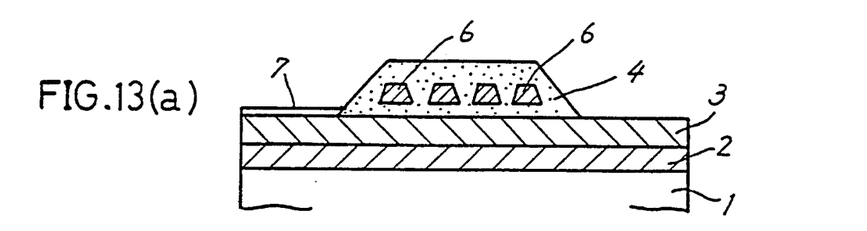
FIGS. 13(a) to 13(d) are cross sections showing a series of steps in the first part of the process of manufacturing the thin film magnetic head.

As shown in FIG. 13(a), the insulating film 2 made of $SiO_2$ is formed on the surface of the substrate 1 made of, e.g., $Al_3O_2$—TiC, and thereafter, a thin metal magnetic film, i.e., lower magnetic core 3 made of Ni—Fe or the like is formed. Then, the conductive coil layer 6 is formed, and the insulating film 4 made of $SiO_2$ is formed to cover the conductive layer 6. Also, the gap spacer 7 is formed at the front core portion.

Figure 13B:
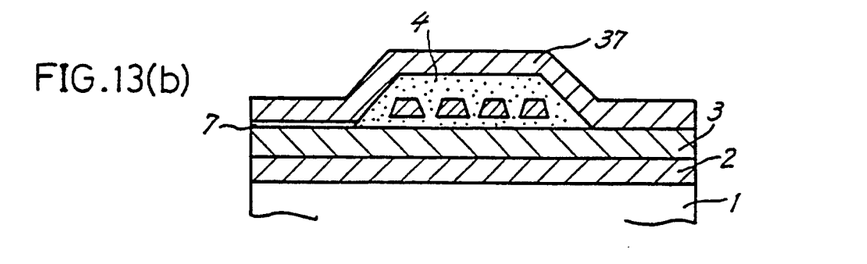

Then, as shown in FIG. 13(b), a metal magnetic film 37 made of Ni—Fe is formed by sputtering or vapor deposition to cover the insulating film 4 and the gap spacer 7.

Figure 13C:
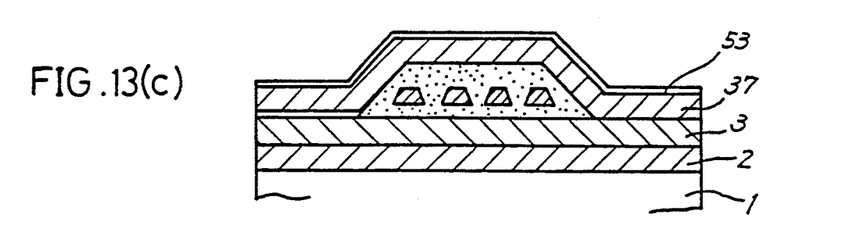

Subsequently, as shown in FIG. 13(c), an insulating film 53 made of, e.g., $SiO_2$ and having a thickness of about 0.1 $\mu$m to 2 $\mu$m is formed on the surface of the metal magnetic film 37 by the sputtering or the like.

Figure 13D:
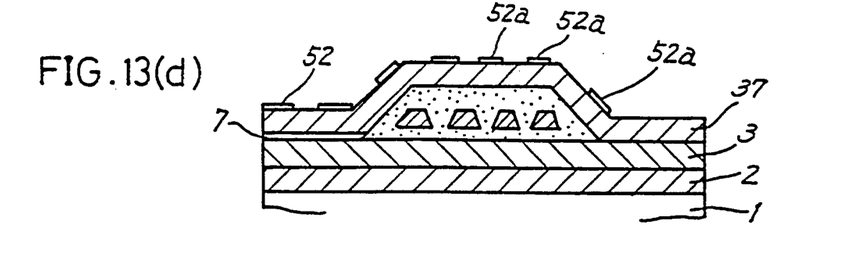

Thereafter, a known etching technique such as RIE is used to etch the insulating film 53 into a predetermined pattern as shown in FIG. 13(d), whereby the plurality of (e.g., several to ten) non-magnetic stripes 52a are formed.

Figure 14A:
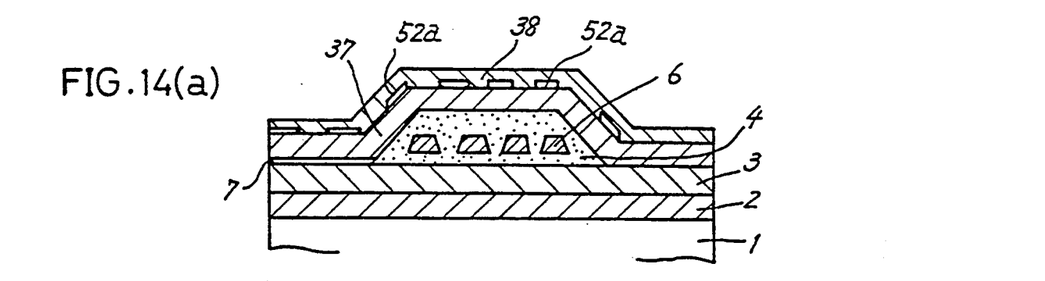
FIGS. 14(a) to 14(c) are cross sections showing a series of steps in the second part of the process of manufacturing the thin film magnetic head.

As shown in FIG. 14(a), sputtering or vapor deposition is effected to form a metal magnetic film 38 which is made of, e.g., Ni—Fe and covers the non-magnetic stripes 52a.

Figure 14B:
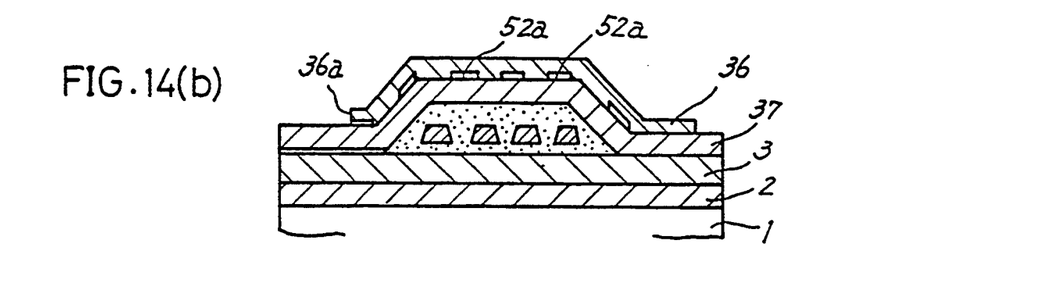

Thereafter, known photolithography is used to etch the metal magnetic film 38 to form the core upper layer portion 36 having a predetermined configuration as shown in FIG. 14(b). Simultaneously, the core lower layer portion at the front core region is finished to have a predetermined thickness for obtaining steepness in the head magnetic field.

In this step, the non-magnetic stripes 52a, which are located under an end surface 36a of the core upper layer portion 36 near the front core, act as a stopper against the etching, so that the thickness of the core lower layer portion 35 at the front core region can be uniform. Therefore, local magnetic saturation is prevented.

Figure 14C:
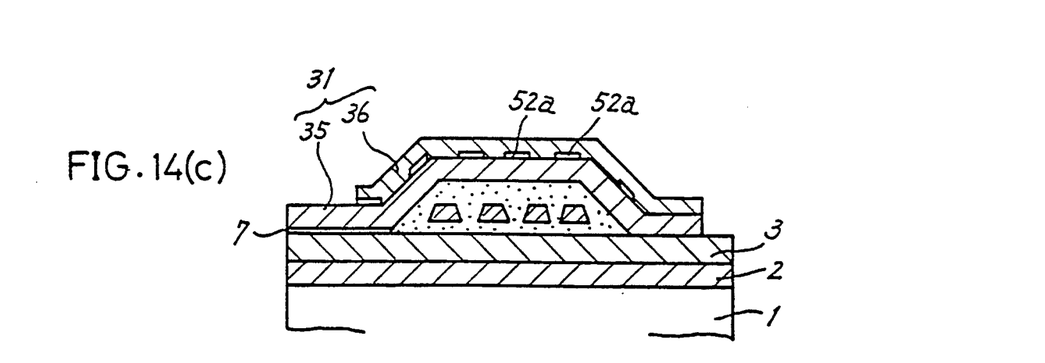

After etching the core upper layer portion 36, photolithography is used to etch the metal magnetic film 37 at the lower position, whereby the core upper layer portion 36 having a predetermined configuration is formed as shown in FIG. 14(c).

Thereafter, steps for forming the protection film, making a chip form and others are effected to complete the thin film magnetic head shown in FIGS. 11 and 12.

Figure 15:
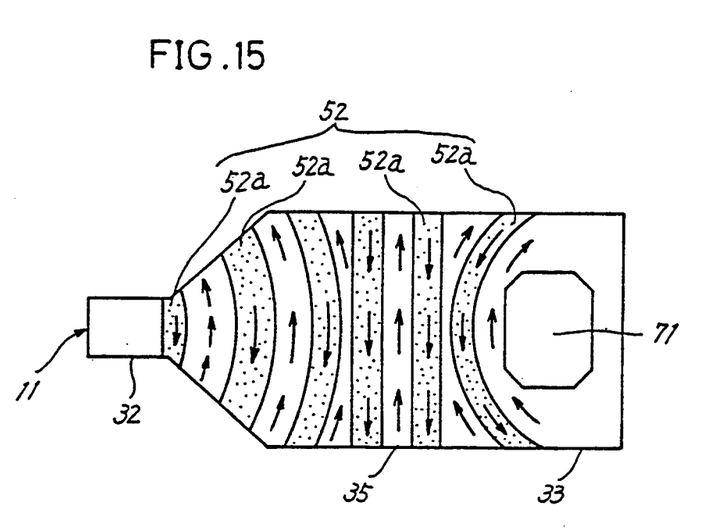
FIG. 15 is a plan corresponding to FIG. 12 and showing another example of the pattern of the non-magnetic intermediate layer.

In a thin film magnetic head shown in FIG. 15, some of the non-magnetic stripes 52a forming the non-magnetic intermediate layer 52 extend circularly and concentrically around the medium contact surface 11 or the back gap portion 71, so that advantages such as reduction of the magnetic resistance and noises as well as increase of the efficiency of the head can be achieved.

Figure 16:
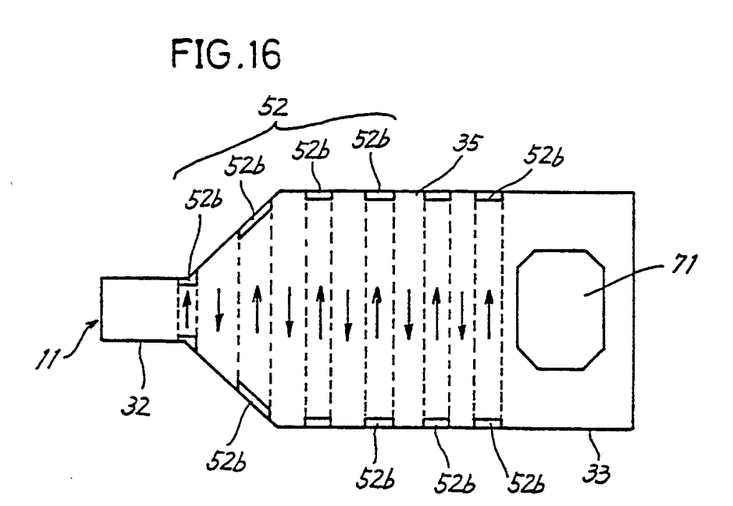
FIG. 16 is a plan corresponding to FIG. 12 and showing still another example of the pattern of the non-magnetic intermediate layer.

In a thin film magnetic head shown in FIG. 16, the upper surface of the core lower layer portion 35 includes a plurality of stripe regions extending in the track width direction, and a plurality of non-magnetic pieces 52b are formed on the stripe regions to form the non-magnetic intermediate layer. The non-magnetic pieces 52b on each stripe region are spaced from each other and are adjacent to opposite ends, in view of the track width direction, of each track region.

Also in this structure, a pair of the opposed non-magnetic pieces 52b function to effect the pinning in the track width direction on the domains of the core, whereby the structure can achieve an effect similar to that by the thin film magnetic head having the non-magnetic intermediate layer 52 in the striped form.

Figure 17:
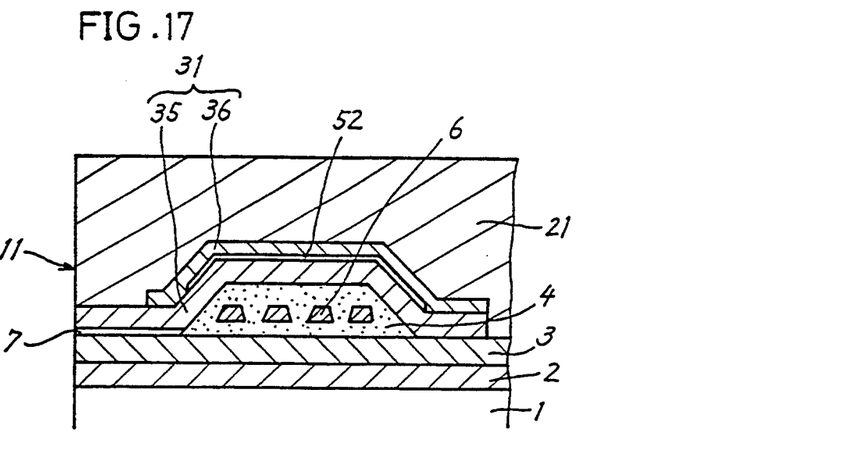
FIG. 17 is a cross section of the thin film magnetic head in which the non-magnetic intermediate layer is formed of a single layer.
Figure 18:
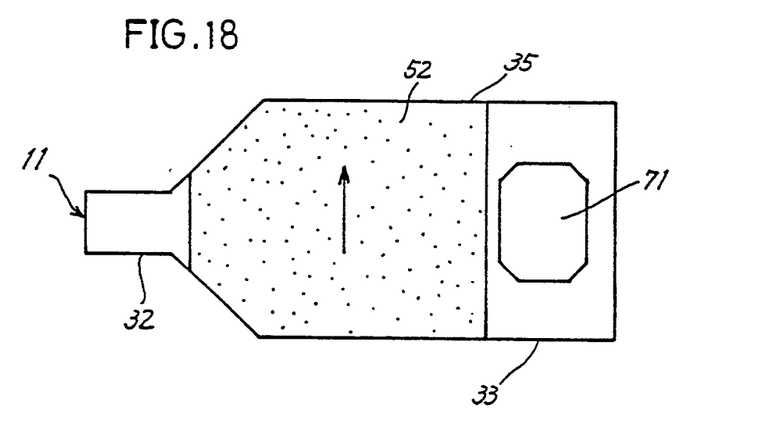
FIG. 18 is a plan showing a configuration of the non-magnetic intermediate layer in the thin film magnetic head.

In a thin film magnetic head shown in FIGS. 17 and 18, the non-magnetic intermediate layer 52 is formed on the upper surface of the core lower layer portion 35 and continuously extends up to the front core portion 32 and the back core portion 33.

In this structure, the domains are stable in the direction perpendicular to the sheet of FIG. 18.

Figure 19:
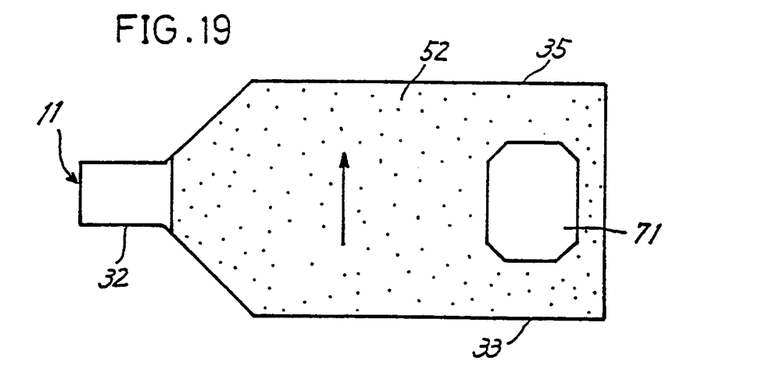
FIG. 19 is a plan showing a modification of the non-magnetic intermediate layer in FIG. 18.

In the above structure, the non-magnetic intermediate layer 52 may be additionally formed around the back gap 71 as shown in FIG. 19.

Although the present invention has been described and illustrated in detail, it is clearly understood that the same is by way of illustration and example only and is not to be taken by way of limitation, and that modifications will be apparent to those skilled in the art without departing from the spirit and scope of the invention as set out in the accompanying claims.

For example, the invention can be implemented not only as the single thin film magnetic head formed of the head chip of the induction type but also as a composite thin film magnetic head formed of combination of the head chip of the induction type and a head chip of a magneto-resistance effect type.

What is claimed is:

1. A thin film magnetic head comprising a substrate, a core made up on the substrate with a lower magnetic core layer and an upper magnetic core layer with said upper and lower magnetic core layers being separated by a non-magnetic gap spacer, said lower and upper magnetic core layers being joined in a back core region but separated by the non-magnetic gap spacer in a transducing gap region, and spaced apart by coil windings enclosed in non-magnetic material between the transducing and back gap regions, wherein one of said magnetic core layers is formed of a core lower layer portion, a core upper layer portion, and a non-magnetic intermediate layer interposed between said two layer portions, said non-magnetic intermediate layer being formed of a plurality of non-magnetic stripes which are spaced from each other and extend in a track width direction.

* * * * *